Oct. 17, 1961 W. PHILLIPS 3,004,372
APPARATUS FOR PRODUCING OPHTHALMIC LENSES
Original Filed Feb. 15, 1956 9 Sheets-Sheet 1

Inventor
William Phillips, deceased
by Edward H. Phillips, Edwin D. Phillips
& Josephine B. Phillips, Executors
by Shoemaker & Mattare Attorneys Inventor
William Phillips, deceased
by Edward H. Phillips, Edwin D. Phillips
& Josephine B. Phillips, Executors
by Shoemaker & Mattare Attorneys

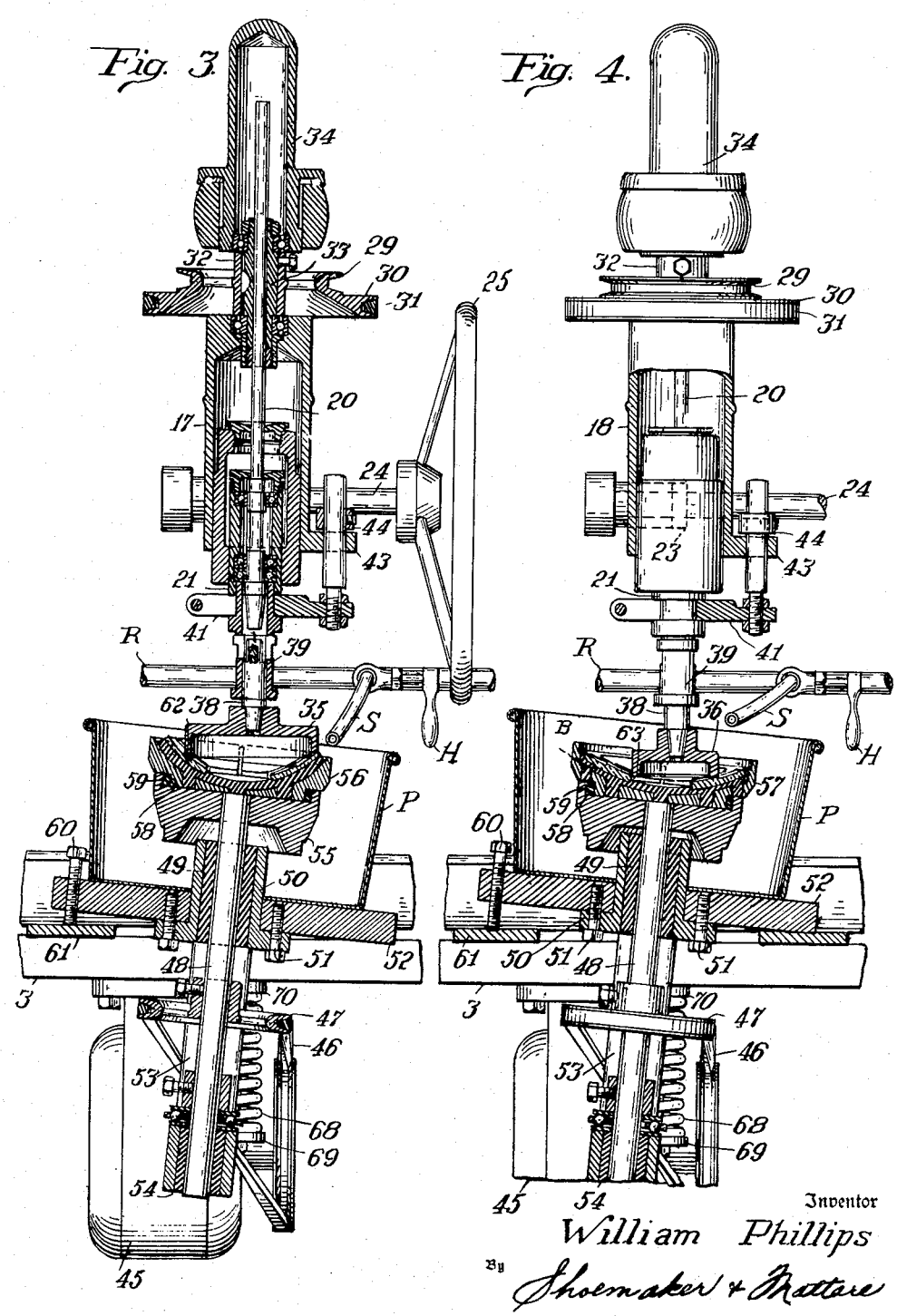

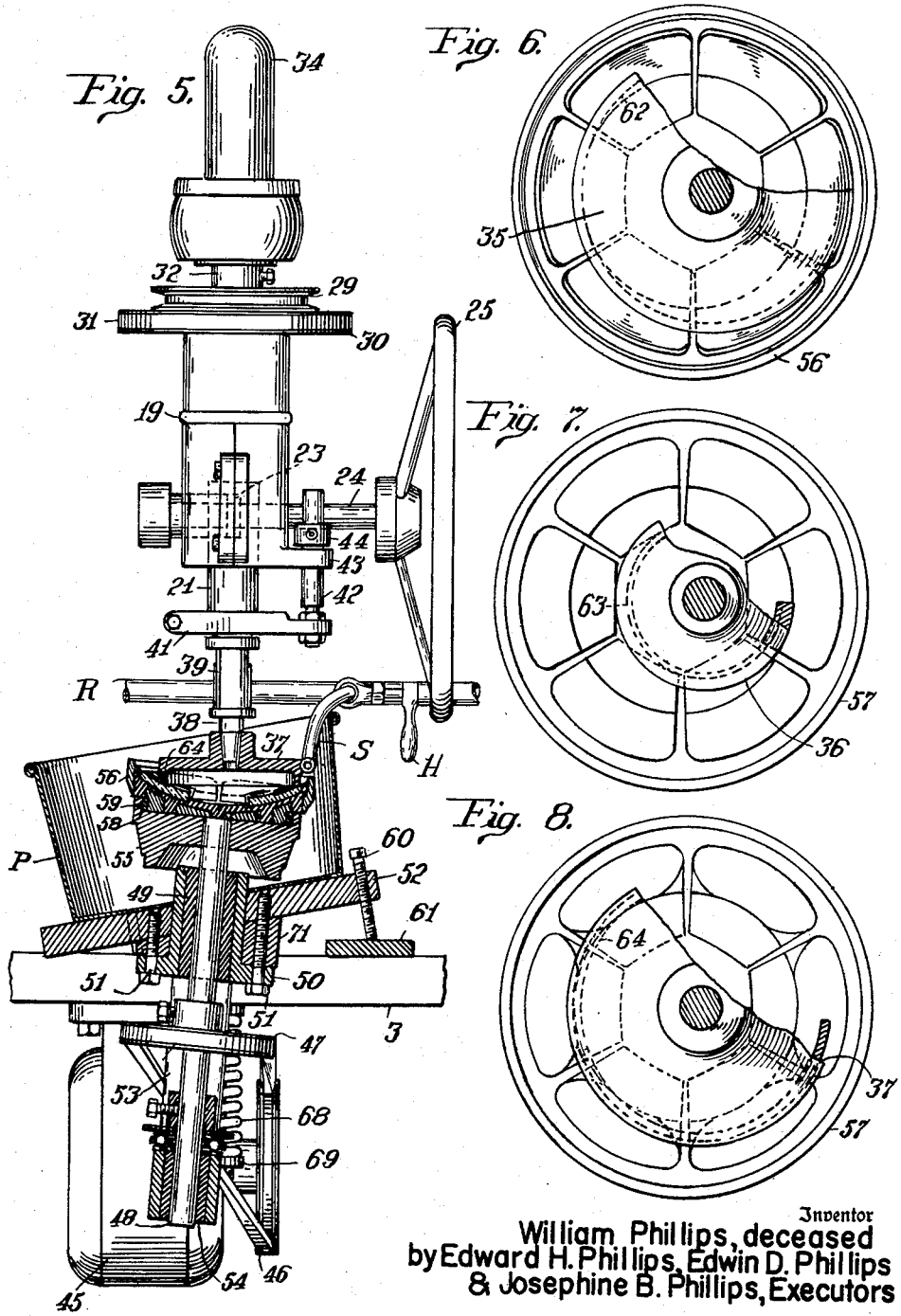

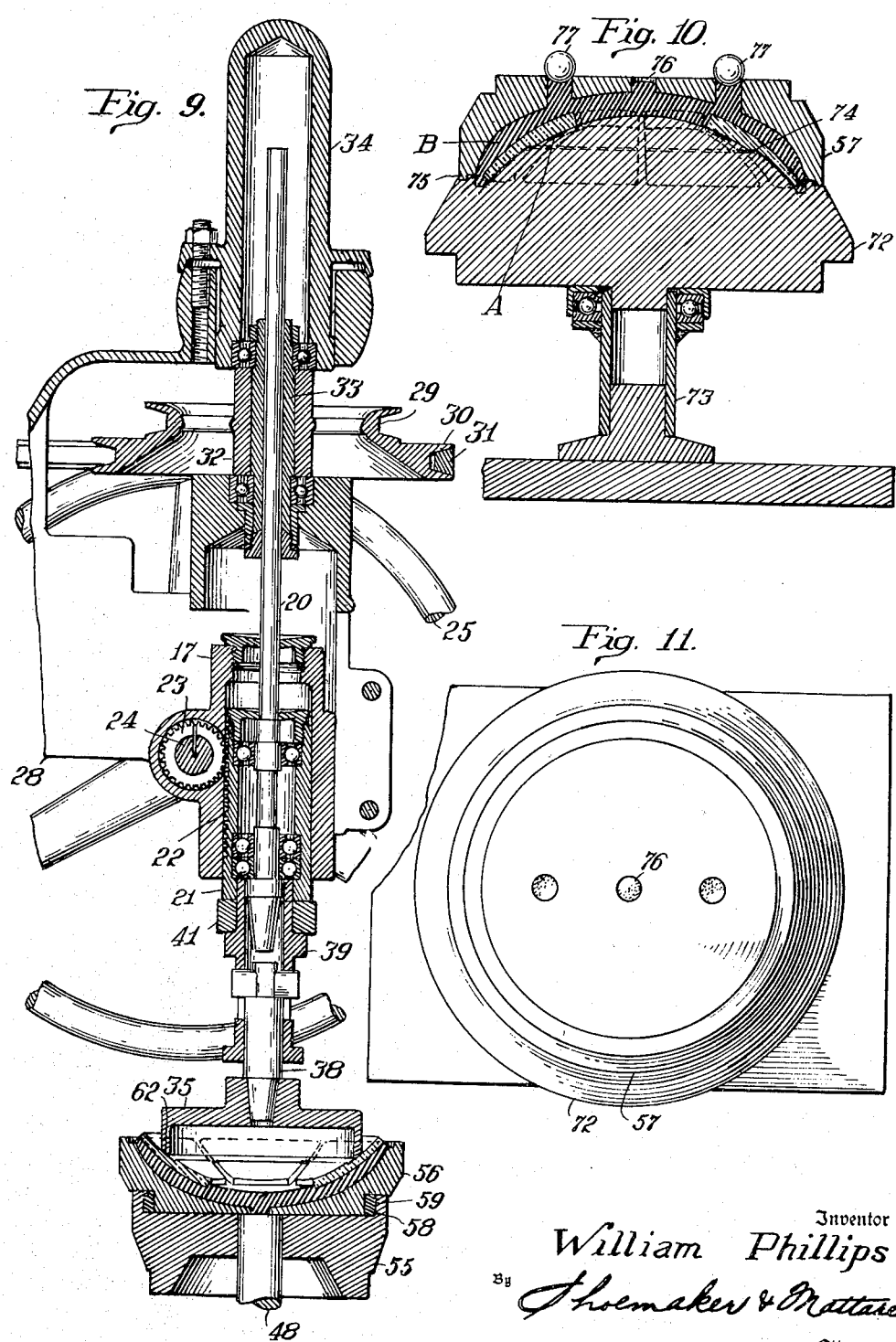

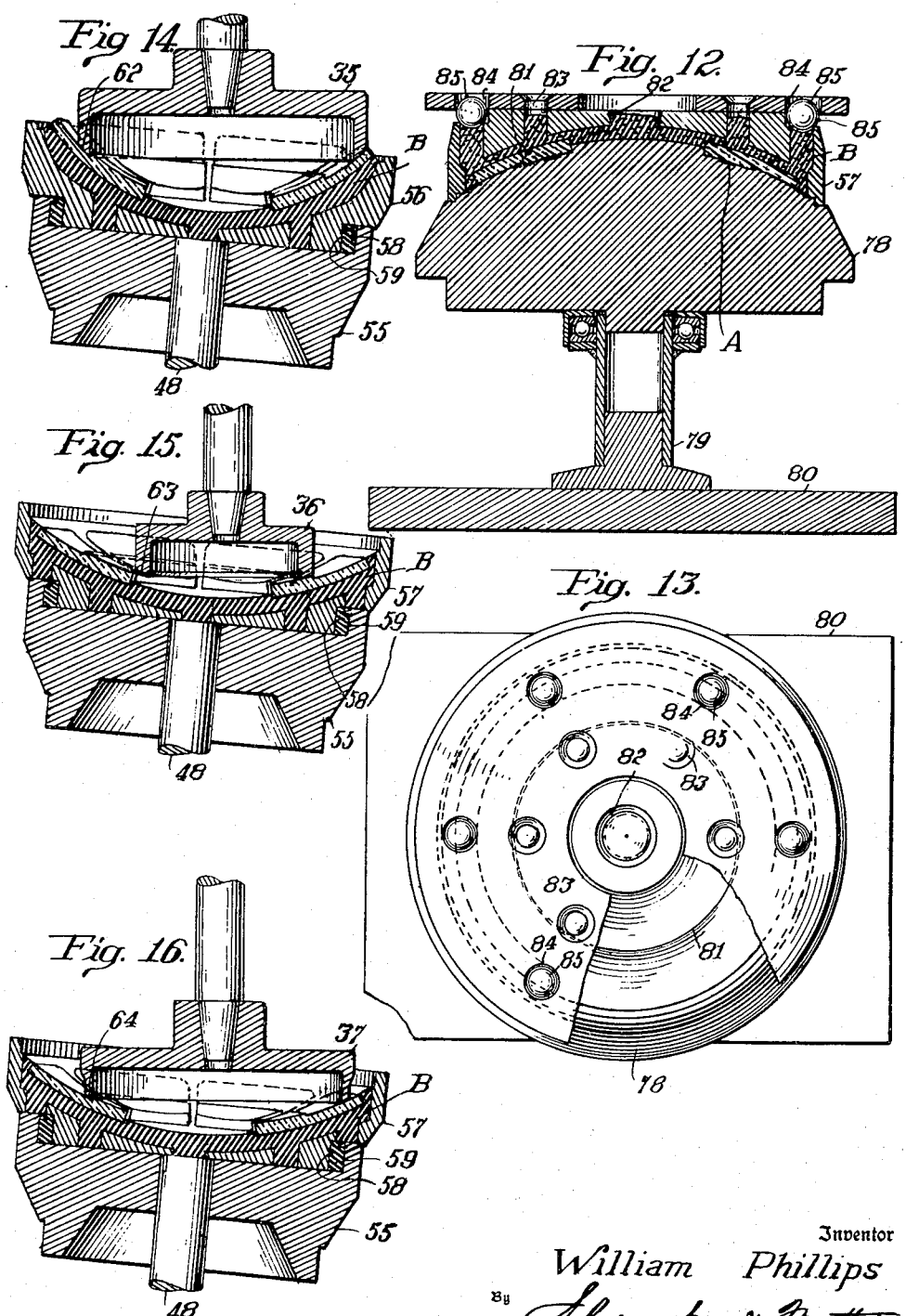

Oct. 17, 1961  W. PHILLIPS  3,004,372
APPARATUS FOR PRODUCING OPHTHALMIC LENSES
Original Filed Feb. 15, 1956  9 Sheets-Sheet 7
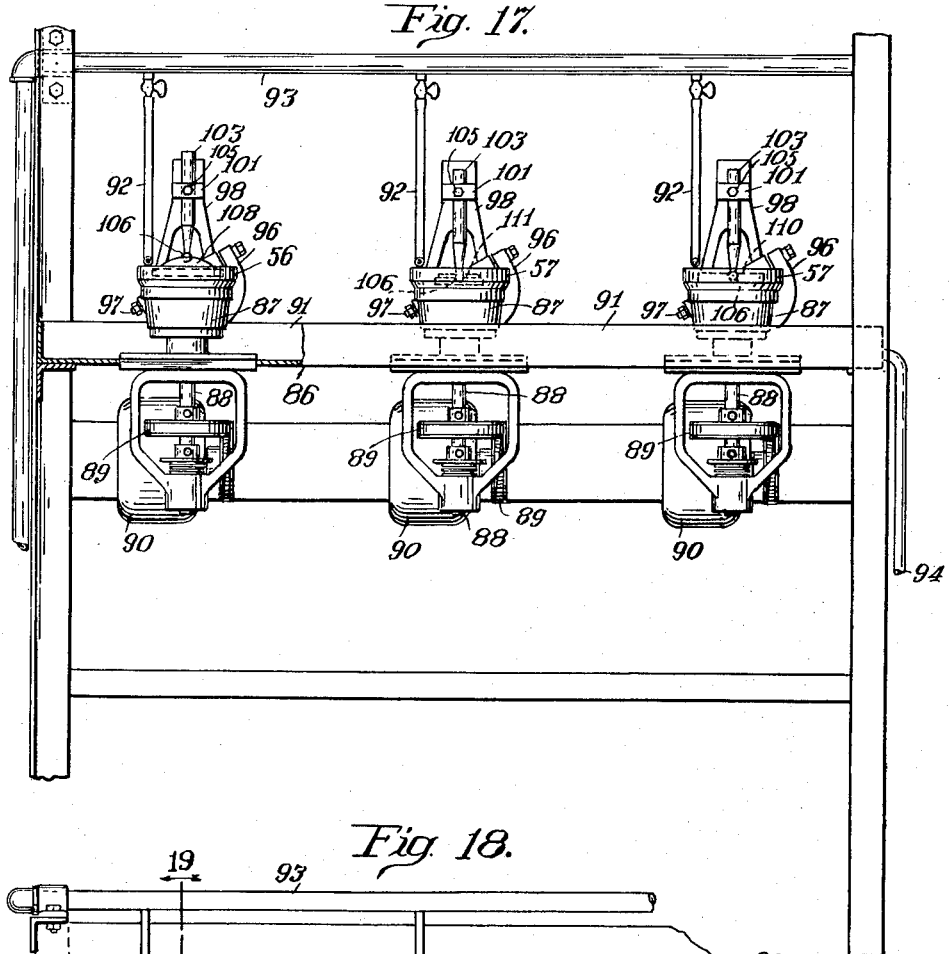
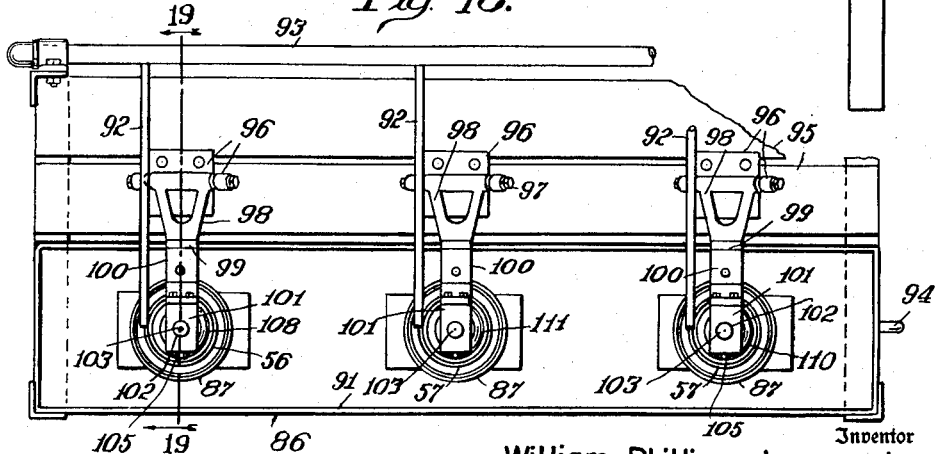
Inventor
William Phillips, deceased
by Edward H. Phillips, Edwin D. Phillips
& Josephine B. Phillips, Executors
by Shoemaker & Mattare Attorneys

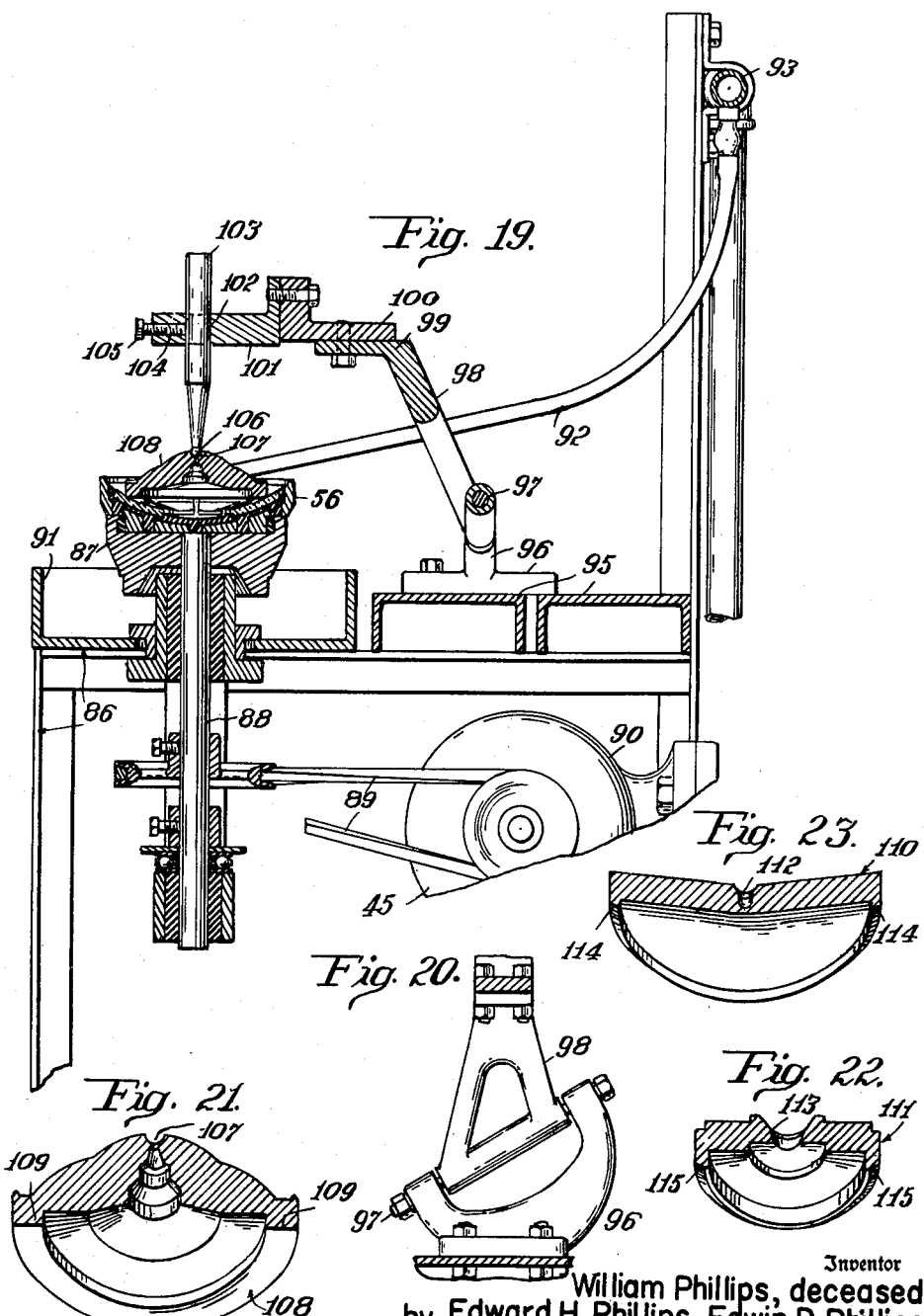

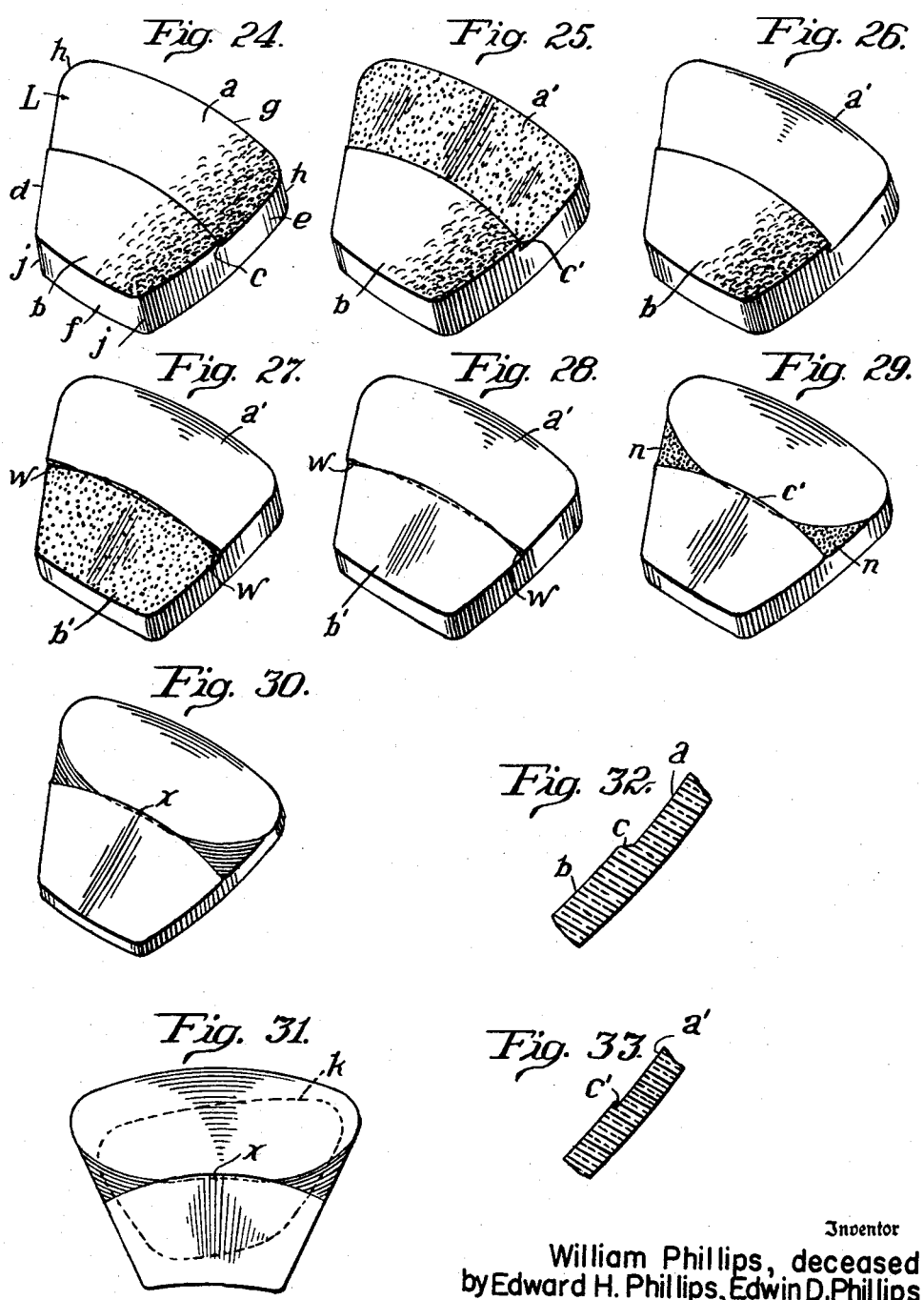

United States Patent Office 3,004,372
Patented Oct. 17, 1961

3,004,372
APPARATUS FOR PRODUCING OPHTHALMIC LENSES
William Phillips, deceased, late of Middlesex, N.J., by Edward H. Phillips, Warrenville, Edwin Donald Phillips, North Plainfield, and Josephine Bernice Phillips, Fanwood, N.J., executors, assignors of one-fourth to Bozena Marie Phillips, one-fourth to Edward H. Phillips, one-fourth to Edwin D. Phillips, and one-fourth to Josephine Bernice Phillips, all of Middlesex, N.J.
Original application Feb. 15, 1956, Ser. No. 565,644, now Patent No. 2,919,523, dated Jan. 5, 1960. Divided and this application Mar. 6, 1959, Ser. No. 797,796
14 Claims. (Cl. 51—131)

The present invention relates to a new process and novel apparatus for manufacturing novel ophthalmic lenses and to the particular lenses so produced.

This application is a division of application Serial No. 565,644, filed February 15, 1956, now Patent No. 2,919,523.

The invention has particular relation to apparatus providing an improved construction of a one-piece, homogeneous, multi-focal, monocentric lens in contrast to a fused, welded, embedded, or cemented type. Specifically, the invention relates to the production of a lens embodying an upper arcuate distance field, a lower arcuate near vision field and triangular intermediate fields the apices of which lie on the line of juncture between the upper and lower fields respectively.

More specifically, the invention relates to apparatus for producing a lens of the type just described embodying an inclined ledge the face of which is directed toward the upper distance field and which ledge extends only along the juncture between the upper and lower fields between the apices of the triangular, spaced, intermediate fields.

It is a further object to provide apparatus which will produce a plurality of the novel multifocal lenses from solid homogeneous blanks simultaneously.

A specific object is to provide apparatus for grinding and polishing a plurality of lens blanks in a predetermined sequence to simultaneously produce a plurality of such novel lenses.

It is an additional object to provide a compact economical apparatus to carry out the process to produce the particular lens described in a succession of correlated, grinding and polishing stages.

It is a further object to provide grinding and polishing apparatus producing the lens in question embodying matrix supports for a plurality of lens blanks and plural cup-shaped grinding tools rotatably mounted for successive application to the blanks to produce oriented, controlled grinding on the plurality of blanks while the same are simultaneously rotated relatively to the tools.

It is also an object of this invention to provide apparatus for producing a lens structure that is solid, homogeneous, embodies multi-focal areas including at least a near vision field and a distance field above the same both of arcuate shape and a ledge or shoulder the surface of which is facing the distance field together with triangular portions at lateral edges of the lens the apices of which coincide and merge into the juncture between the distance and near vision fields with the ledge or shoulder existing only between the said apices and with the triangular portions being merged into the faces of the distance and near vision fields respectively. The lens so produced is free of light reflection and the vision obstructing jump occurring with conventional bi-focal lenses when the axis of sight coincides with the juncture between the distance and the near vision fields and is trained on a line of type or words. This jump is such that the words are either cut in half or blurred requiring that the eye be shifted vertically constantly when reading or utilizing the near vision field.

The prior art is replete with lenses of various types including solid lenses purportedly eliminating this jump and the light reflection at the point of transition or juncture between the near and distance field. However, it has been found that such prior art structures do not embody the particular blending or merging of the triangular intermediate field portions with the upper and lower distance fields nor do they embody the inclined shoulder only between the apices of the triangular portions to eliminate reflection and optical jump.

The prior art is also replete with complicated, costly and cumbersome grinding apparatus for producing lenses of the solid type but it is not possible with known means and apparatus to simultaneously produce a plurality of lenses of the complex, monocentric, multi-focal type simultaneously.

Therefore, it is a broad object of the present invention to provide apparatus for producing such a lens that is economically feasible, lends itself to small or large scale operation, and successfully produces a plurality of solid, multi-focal, monocentric lenses.

With reference to the foregoing objects and broad description of the invention, it is herein pointed out and emphasized that the use of the word plurality comprehends at least two and is usually a number such as five, six, eight or more and, therefore, the present invention by reference to plurality is intended to be and does in fact constitute an exceptional advance in the art of simultaneously producing more than two multi-focal, monocentric lenses, for instance the particular embodiment referred to hereinafter relates to the production simultaneously of six such complex multi-focal lenses.

In this connection, it should be clearly understood that the apparatus can produce one lens at a time in a particular manner so that the scope of the claims must be so interpreted but for economic reasons it is desirable to simultaneously produce a plurality of novel lenses.

Further and more specific objects will be apparent from the accompanying drawings in which:

FIGS. 3, 4 and 5 are partial front views partly in section of the three grinding positions shown in FIG. 1;

FIGS. 6, 7 and 8 are top views of the blank supporting matrix and the tools in the positions shown in FIGS. 3, 4 and 5, respectively;

FIG. 9 is a sectional view on a larger scale taken along lines 9—9 of FIG. 1;

FIGS. 10 and 11 are sectional and top plan views respectively of the matrix plate or dish in assembled relationship with the blocking fixture illustrating the assembly preparatory to use in connection with the first grinding operation;

FIGS. 12 and 13 are corresponding views showing the assembly for use in connection with the second and third grinding operations;

FIGS. 14, 15 and 16 are enlarged sectional detail views of portions of FIGS. 3, 4 and 5 respectively and illustrating the relationship of the grinding tools to the blanks in the respective grinding operations;

FIG. 17 is a front elevational view partly in section of the polishing portion of the apparatus;

FIG. 18 is a partial top plan view of FIG. 15;

FIG. 19 is a sectional view on an enlarged scale taken along lines 19—19 of FIG. 18;

FIG. 20 is an enlarged view of the pivotal mounting for the shaft of the polishing disc;

FIGS. 21, 22 and 23 are part perspective, part sectional views of the three polishing discs utilized in the invention;

FIGS. 24 through 30 illustrate in perspective a moulded raw blank and the lens blank throughout the various successive grinding and polishing stages;

FIG. 31 is a top plan view of a finished lens illustrating some of the various shapes of lens obtainable;

FIGS. 32 and 33 illustrate in section and on an enlarged scale the ridge as moulded on the raw blank and the ledge as formed after the first grinding operation.

Figure 1:
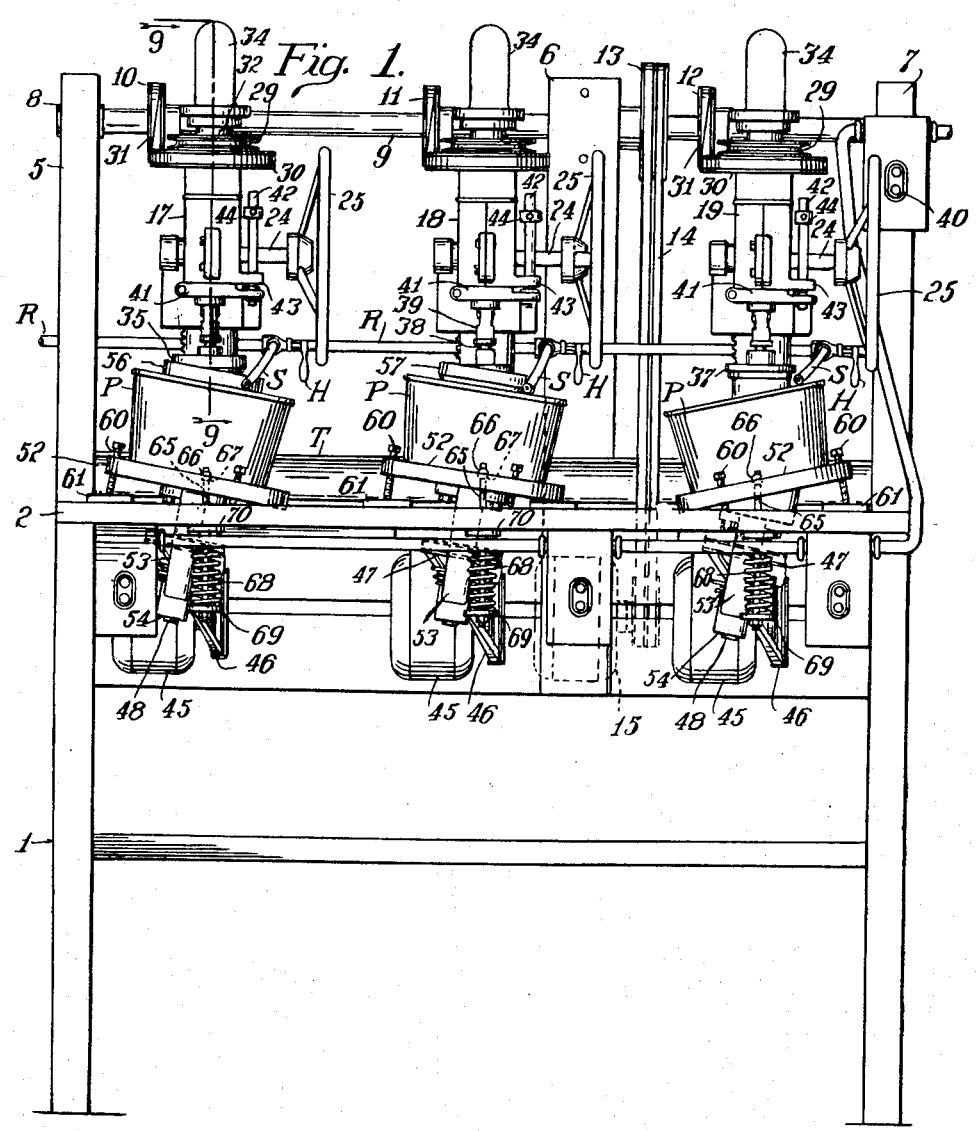
FIG. 1 illustrates a front elevational view of the grinding portion of my apparatus.

As indicated in the drawings, the apparatus includes a grinding or generating assembly embodying a battery of grinders, as shown in FIG. 1, and a polishing assembly including a plurality of polishing mechanisms shown in FIG. 17. The matrixes or cups disclosed in FIGS. 10 to 16 are utilized to support the lens blanks during grinding and polishing.

Each of the grinders described more in detail hereinafter includes a vertically movable, rotatable spindle upon which is mounted a cup-shaped or annular grinding head of the diamond type. The grinding assembly further includes a support or table upon which rest in angularly adjustable position, plate members, supporting pans and receiving the shafts of rotatable supports that hold the cups carrying the lens blanks. The cups are confined within the pans during grinding and a suitable oil and water mixture is pumped into each pan during grinding for lubricating purposes. The mixture drains from each pan into an inclined trough supported on the table as set forth hereinafter.

Each polishing mechanism comprises a rotatable support for holding the cups carrying the lens blanks so that they rotate about vertical axes. Cooperable with the supports are pivotally mounted spindles or posts that rest upon and hold a polishing head in contact with the blanks. The spindles are vertically adjustable and associated with the polishing heads so that the latter can move universally relative thereto. Each polishing head or cup is inverted in use and includes an annular beveled effective polishing surface that engages the blanks and an upper bearing or socket in the top thereof receiving a ball on the bottom of each spindle.

It is to be noted that the respective batteries of grinding and polishing mechanisms each includes three tool units of different size applicable respectively to grind or generate and polish the distance field, the reading field and the intermediate fields on the blanks.

A homogeneous lens blank preferably having the shape illustrated in FIG. 24, the characteristics of which shape are described in detail hereinafter, is utilized as the raw material for the apparatus. The moulding of the blank is such that the raw blank includes discrete upper and lower areas in different arcuate planes separated by an arcuate ridge extending transversely of the blank from edge to edge and facing outwardly of the rear or convex side of the blank so that the arcuate plane defining the portion of the blank which is to embody the reading field is outwardly of the plane containing the upper portion upon which the distance field is generated.

After the raw blank has been made the same is semi-finished on the plus or outside thereof. After this operation is completed, the plus side of the blank, as far as the present invention is applicable, is completed and is not subjected to any further operations.

A plurality of blanks, six as embodied in the drawings, are then secured by plaster of Paris to a convex blocking fixture. The radius of curvature of this fixture is determined by the amount of glass that is to be ground off the minus or inner concave face of the blank for generating the distance field. This radius of course varies depending on variations in amounts to be ground off dependent upon optical tables for determining the particular type of lens to be produced. With the blanks secured to the blocking fixture a cup having an apertured bottom is fitted over the fixture in such manner as to leave a space between the convex side of the blanks and the inside of the cup. With the cup and fixture so assembled, pitch is introduced into a central hole in the cup and when the pitch rises to view in outer concentric holes in the cup, the space between the cup and fixture has been filled and blanks are thus secured to the inside of the cup. The cup is removed from the fixture and is ready for the first grinding stage.

In effecting this step the cup is mounted on the rotatable support within the pan subjacent the grinding head of a size to generate the general vision or distance field in the upper portion of each blank. As shown in the drawings, the annular blank contacting portion of the grinding head is beveled so that with the plate holding the rotatable support being predeterminedly angularly adjusted an arc of the contacting portion of the head when lowered snugly engages the surface of one blank along the upper periphery thereof and the diametrically opposite arc portion of the head snugly engages the surface of the diametrically oppositely positioned blank immediately adjacent the ridge or shoulder separating the upper and lower portions of the blank. This adjustment assures that when the head is fed downwardly the complete distance field of each blank will be generated as the cup and head rotate, since the extent of the beveled portion and the diameter of the head are in such relation to the size of the distance field that, during rotation, the portions of the distance field inbetween the upper periphery and the ridge of these blanks are contacted by different arcs of the tool or head. The blanks inbetween the aforesaid diametrically opposite blanks likewise have their distance fields completely generated by successive passes of different arcs of the tool. With the correct adjustment effected, the head is fed to the cup so as to generate the entire distance field of each blank. This first grinding operation simultaneously forms a slightly inclined ledge the face of which is directed toward the distance field, that is the ledge face slopes downwardly from rear to front as seen in FIG. 33. The downward feeding of the head can be effected by hand if the grinders are of the type shown or a tool including an automatic feed mechanism and depth of travel control as embodied in Patent 2,396,733, can be utilized. When the distance field has been generated, the cup is removed and mounted on the polishing mechanism sized to polish only the area of the lens blanks encompassing the distance fields. In this connection, the various polishing heads are of different diameters and the blank contacting surfaces vary from head to head so as to confine the polishing to the particular field. To ensure this effect, the sockets or bearings on the heads are of different sizes and cooperate with different sized balls on the posts or spindles.

Having completed the first grinding and polishing stages the blanks are dismounted from the cup by chilling in liquid, usually water, at about 40° F. If desired, the chilling to crack the pitch to permit dismounting of the blocks can be effected in a refrigerated enclosure. The dismounted blanks now have a raised reading or lower portion as shown in FIG. 26.

The partially prepared blanks are again arranged in a circular series and secured by plaster of Paris, spot sticking, on another and different blocking fixture that has the curve of the reading power of the lens blank so that the finished lenses will be monocentric. Another and different cup is mounted over the fixture as before and pitch introduced between the cup and fixture to secure the blanks to the second cup. This cup is then mounted on the rotatable holder subjacent the head for grinding the reading field, the plate supporting the spindle of the holder having been angularly adjusted to such a position that the second grinding head which is smaller than the first and likewise has a beveled grinding surface contacts the lower portion of one blank and the portion of the diametrically opposite blank adjacent the ledge and contacts portions of the other blanks along such arcs that relative rotation assures the tool grinding the complete reading field of each blank.

The size relationship and extent of the effective grinding surface of this second head are such that the upper line of the reading field is arcuate and delimited in the center by the ledge formed in the first grinding and polishing stage. This second grinding stage leaves oppositely disposed triangular shaped portions of each blank unground. Therefore, the same cup is mounted beneath the third grinding head which has a size and shape after adjustment of the plate so as to grind only the triangular portions constituting the intermediate fields. This third head is lowered and these fields ground. Then the same cup is mounted consecutively on the second and third polishing mechanisms to respectively and consecutively polish the reading fields and the intermediate fields of the blanks. The final polishing stage completes the operation on the blanks so that a monocentric, homogeneous lens is produced. The third grinding stage grinds off all the ledge lying along the juncture between the distance and reading fields except that portion between the apices of the triangles defining the intermediate fields and also merges the intermediate fields smoothly into the upper and lower distance and reading field portions of the lens respectively.

The process thus set forth results in the simultaneous production of a plurality of lenses and by plurality is meant a number preferably considerably in excess of two so that the process is economically feasible and lends itself not only to mass production but also to small scale operations.

The drawings illustrate the three grinders and three polishers in operation since in effecting this process the several stages of grinding, polishing, assembling and disassembling blanks relative to cups and other manipulations are occurring simultaneously on different batches of blanks. The steps just set forth define the several stages of operation to which each group of blanks is subjected. Thus it is obvious that the batteries of grinders and polishers could embody a greater number of units in order to handle a greater number of blanks.

With regard to the apparatus of this invention and as shown in FIG. 1, the grinding assembly comprises a stand or table 1 including an upper supporting surface 2 composed of a plurality of parallel members 3 extending lengthwise of the stand. A space 4 is provided between two of the members so as to accommodate the shafts of the cup holders. Extending upwardly from the rear of the table are parallel and longitudinally spaced uprights 5, 6 and 7. These uprights are provided with journal bearings one of which is designated at 8, FIG. 2, for journaling a power shaft 9 having thereon spaced driving pulleys 10, 11 and 12 and a multiple driven pulley 13 driven by belts 14 from a motor 15 also supported on upright 5 by any suitable means such as the bolts 16 shown in the drawing. Supported on the surface of the table adjacent each of the pulleys 10, 11 and 12 are grinders denoted as 17, 18 and 19. Each of these grinders is similar and only one of the same will be described. In connection with the grinders, the type illustrated is a hand fed drill press type as embodied in Patent 1,434,564, to Rentsche with a manual depth control although a selective manual or power fed type as shown in Patent 2,396,733, may be employed.

Each grinder as illustrated in FIG. 9 includes the vertical spindle 20, a quill 21, a rack 22 meshing with a pinion 23 for moving the quill. The pinion 23 is carried on the shaft 24 which is rotated by the hand wheel 25 whereupon manual rotation of said hand wheel feeds the spindle up or down in the customary manner. In order to provide for rapid position adjustment the grinder includes a fixed supporting post 26 and an adjustable post 27 carrying the arm 28 that supports the spindle and its drive mechanism. A small handle 28a is manually operated to initially position the head of the machine, by effecting movement of post 27 on post 28. Each grinder embodies plural pulleys 29 and 30 selectively receiving a belt 31 for driving the spindle. The pulleys have a common hub 32 keyed to a sleeve 33 in turn in splined relation with the spindle 20, so that the spindle can move vertically relative to the sleeve. A suitable cap 34 closes the upper end of the spindle housing so as to keep out dirt and the like. Grinding tools 35, 36 and 37 are secured to stub spindles 38 in turn carried by chucks 39 associated with the lower end of the spindles 20. The tools are annular cup grinders of the diamond type with beveled or inclined lens blank contacting surfaces. Thus the effective grinding area of each tool is delimited by the extent of the bevel. As previously explained, the diameter of the grinders and the angularity and extent of the bevel face vary for each of the fields of the lens to be produced. A master switch 40 is in circuit with the motor 15 and the power source and controls the motor so that all of the grinders rotate simultaneously. This feature is embodied for commercial reasons since in production line operation each grinder will be operating on a group of lenses, but on different fields thereof. The grinders each include a depth of cut control embodying a horizontal arm 41 that moves up and down with the quill and chuck and a vertical arm 42 fastened thereto passing through an aperture in a flange or boss 43 on the grinder head and carrying an adjustably positioned stop member 44 which can be set relative to its height above the flange so that when the quill and spindle move down the engagement of the undersurface of stop member 44 with flange 43 stops the feed and indicates to the operator that the particular grinding stage is completed.

For holding and rotating the lens blanks, each grinder has positioned beneath the spindle thereof the rotary assembly for the lens blank holding cups. Each assembly includes an electric motor 45 operable through a belt drive 46 to drive a pulley 47 fast to a spindle 48. The spindles 48 pass through upper sleeve bearings 49 held in a flanged tubular collar 50 that is secured by threaded bolts 51 to an apertured plate or disc member 52. The collar constitutes part of a yoke 53, the lower end of which receives a bearing 54 for the bottom of spindles 48. The collar and spindle project above the plate member 52 and are surrounded by a pan for receiving grinding lubricant. To the upper end of the spindles the cup holders 55 are fixed. These cup holders are of a size to receive the lens blank holding cups 56 and 57 and a rubber gasket 58 is mounted on the inner periphery of cup holders 55 so that the reduced portion 59 of the blank holding cups 56 and 57 must be forced into driven cup holders 55 and the resultant friction fit provides the in-drive between cup holders 55 and cups 56.

Thus, the drawings, FIGS. 3, 4 and 5, illustrate respectively the consecutive grinding stages, FIG. 3, disclosing the relationship of the lens blank holding cup 56 with the grinding head 35 positioned to grind the general vision or distance field. The plate member 52 is a disc, bearing at edges on the spaced parallel members 3 constituting the upper supporting surface 2. The opposite edge of the disc has a threaded aperture therein through which is engaged an adjusting bolt 60, the lower end of which abuts against a cross member 61 in the form of a metal strip extending transversely of the space 3 and between the parallel members constituting the supporting surface 2. As previously described, the effective grinding surface 62, 63 and 74 of each cup head or tool is beveled. The diameter of the grinding cup 35 as shown in FIG. 3 is such as to generate or grind only the upper distance or general vision field provided the proper angular adjustment of the disc 52 relative to the tool axis has been made. As disclosed, the spindle 20 rotates on a vertical axis. By adjusting the bolt 60, the disc or plate member 52 is tilted until the beveled surface of the tool 35 engages the surface of one lens blank adjacent the top marginal edge thereof and the surface of the diametrically opposite lens blank, adjacent the ridge, separating the upper distance field from the lower reading field. This relationship is shown in FIGS. 3, 6 and 14.

Figure 2:
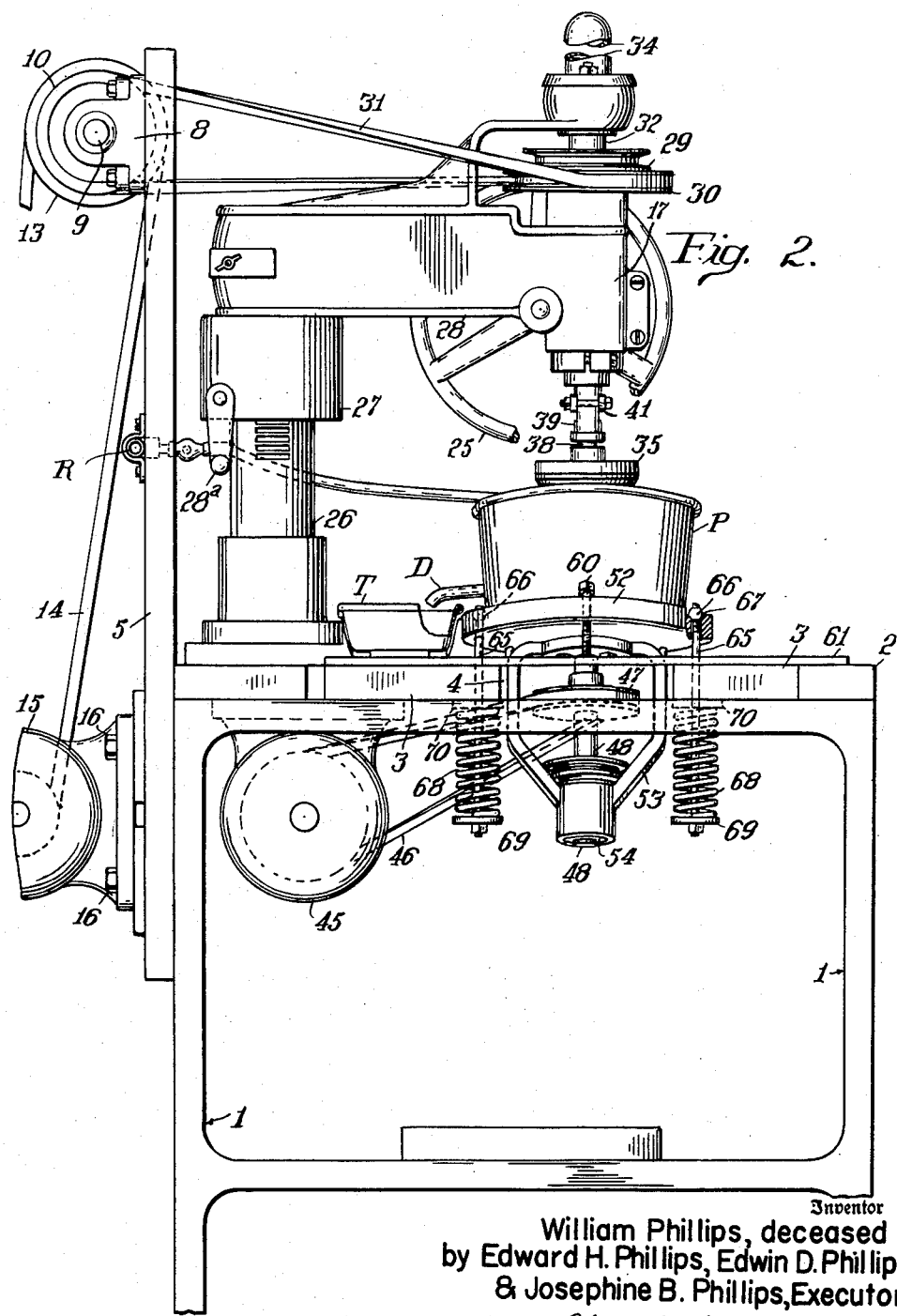
FIG. 2 is an end elevation on an enlarged scale looking to the left in FIG. 1.

In order to provide a resilient mounting for each plate 52 and spindle 48, shown more particularly in FIG. 2, the plate 52 has apertures receiving pintles or pins 65 terminating in rounded heads 66 seated in correspondingly shaped depression 67 in the upper surface of the plate. Springs 68 are biased between opposed spaced washers 69 and washer 70 on the pin 65. Thus, the plates 52 are constantly downwardly urged away from the grinding tool or head.

In FIG. 4, the related arrangement is provided for generating the reading field. The grinder 36 is of a different size and retains its proper angular relationship to the spindle 48 and the cup 57 carrying the lens blanks rotating with the spindle. Both ends of the diametrically opposite portion of the disc 52 about transverse members 61. Here again, the bolts 60 cooperate with or cross one of the members 61 to provide the proper angular relationship.

As illustrated in FIG. 5, apertured angular wedge member 71 has been disposed between the bottom surface of the plate 52 and the flange of tubular collar 50. A transverse member 61 extends beneath the bottom of one portion of the plate or disc 52 and bolts 60 again cooperate with this and also the parallel members 3 in the adjustment, of the angularity of spindle 48 with respect to the axis of the spindle 20.

The particular relationships of the grinding tools or heads 35, 36 and 37 to the blank holding cups 55, 56 are more clearly shown in FIGS. 14, 15 and 16.

As indicated in each of these figures, the axis of rotation of the respective tools 35, 36 and 37 is vertical, each of the spindles 48 as previously described being inclined to the vertical so that the lens blanks mounted in the cups, due to the inclination and to the varied diameter and varied extent of the grinding surface of the respective tools, are ground in successive stages over different areas thereof. In other words, in the cup 56, the blanks are so disposed with respect to the tool 35 and as shown in FIG. 14, the beveled blank contacting surface of this tool, when lowered into engagement with the blank, initially contacts one blank of the circular series along the upper marginal edge thereof and the opposite blank of this series immediately adjacent the ridge or shoulder separating the lower reading field from the upper distance field portion. By comparing FIG. 14 with FIG. 6, which is a view of the same arrangement in plan, it is clearly indicated that the blank contacting portion of the tool as comprised by the outer peripheral edge of the tool 35 and the dotted line immediately inwardly thereof, is such that upon the rotation of both the tool and the cup 56, and the downward feeding of the tool 35, the area of each blank from the upper marginal edge down to and including a portion of the blank material on an arcuate line acts as the juncture between the distance and reading field. As shown in FIG. 14, the inner peripheral wall of the annular portion of the tool 35 forms a sharp angle at its juncture with the beveled grinding surface, as previously indicated and as will be described in detail hereinafter.

Upon the lowering of the tool toward the blanks, this sharp edge is effective to transform the ridge separating the upper portion of the blanks and the lower portions into a ledge the plane of which, as viewed in FIG. 14, extends at a downward angle toward the upper face of the blanks. In other words, the raw blank as moulded is provided with a shoulder or ridge, the face of which is directed away from the upper portion of the rear of the blank. In this first grinding stage, this ridge is transformed into a ledge, the face of which is directed toward the upper or distance field portion of the blank.

In connection with FIG. 15, there is illustrated the relationship in section occupied by the tool 36 relative to the cup 57 with the blanks therein. In this relationship, the beveled grinding surface is not as sharply inclined as that of tool 35 and is of less extent. The angularity of the axis of the spindle 48 relative to the axis of the rotation of the tool 36 is such, when coupled with the inclination of the active grinding surface of this tool and the diameter of the tool and further in view of the different arc of curvature constituting the plane containing the rear or outer faces of the blanks in the cup 57 is different from that of cup 56, that the relationship shown in plan in FIG. 7 exists wherein the blank contacting area of the tool meets one lens blank on the arc commencing with the line of juncture separating the reading from the distance field portions and this arc of contact as shown in this figure extends over successively lower portions of the next two adjacent blanks on the lower side of the diametrical half of this figure and is on an upward curve on the upper diametrical side of this figure, dealing with a horizontal diameter, so that upon relative rotation of the cup 57 with the blanks therein and the tool 36, only the reading field portion of the blank is ground.

Upon consideration of FIG. 16 as indicated in the description relative to the method, the angularity of the blank contacting face of the tool 37 is again different as compared with the tools 35 and 36 and the diameter of the active grinding circle is different so that, as shown in FIG. 8, upon relative rotation of the cup with the blanks therein and the tool 37, only the intermediate field portion is ground.

As previously set forth, the cups 56 and 57 are different as regards the arc of curvature of the bottom thereof and the diameter. Therefore, it is necessary that two blocking fixtures be employed for mounting the lenses on the cups. These fixtures are disclosed in FIGS. 10 to 13 respectively.

In FIG. 10, a blocking fixture 72 is rotatably supported on a pedestal 73. This fixture is provided with a ledge denoted at 74 so that when the raw blanks are disposed in a circular series, this ledge will be abutted by the arcuate shoulder on the blanks separating the upper distance field portion from the reading field portion. The radius of curvature of this blocking fixture, as previously indicated, is determined by the amount of glass to be ground off. The blocking fixture is provided with a horizontal ledge which supports the upper edge 75 of the cup 57 so that the bottom of this cup which is arcuate is spaced from the uppermost faces of the supported blanks. Pitch B is poured into the central aperture 76 until the space between the blocking fixture, the upper face of the blanks and the inner surface of the cup is filled. Balls 77 or equivalent plugs are placed over the outer apertures and when the pitch is visible in the central aperture, aforesaid space has been filled.

As described in connection with the process, the blanks are secured in position on the blocking fixture 72 by plaster of Paris A. Thus, there has been provided an arrangement effective upon the hardening of the pitch to properly position the series of blanks in a circular series as indicated in FIG. 6 so that the subsequent grinding step is effected on each blank.

After the first grinding stage and first polishing operation, as set forth hereinafter, have been completed and the upper distance field generated, the blanks are dismantled from cup 56 as previously set forth and again assembled in circular series by plaster of Paris on a blocking fixture 78 shown in FIG. 12 which likewise is rotatably mounted on a pedestal 79 which rests on a suitable base support 80. As shown, the radius of curvature of this blocking fixture 78 differs from the fixture 72 because the second and third grinding stages are to be effective on the reading field portion and intermediate field portions of the lenses. However, a ledge 81 is still incorporated with the upper surface of the fixture 78 to properly position the blanks. The upper edge of the cup 57 is again supported by a ledge on the blocking fixture so that there is space between the upper surface of the blanks and the undersurface of the cup. As shown in FIG. 13, this second cup is provided with a central aperture 82 and a concentric series of apertures 83 and 84. Suitable plugs 85 are mounted in the apertures of the outermost series and pitch poured into the central aperture until it is visible in the aperture 83 indicating that sufficient pitch has been incorporated between the upper surface of the blanks and the undersurface of the cup which, upon hardening, will properly support the blanks in the cups.

All further grinding and polishing operations are effected with the blanks in cup 57.

In summation, therefore, and as disclosed in the drawings, dealing with six raw blanks, the same are first mounted on blocking fixture 72, secured in position in cup 56, ground by tool 35, subjected to the first polishing operation and then removed from cup 56. The same blanks are next mounted on blocking fixture 78, secured to cup 57, successively ground by tools 36 and 37 and then successively subjected to the second and third polishing operations.

As set forth, after the first grinding stage has been completed, the general vision field is polished. In this connection, a polishing apparatus as shown in elevation in partial top plan in FIGS. 17 and 18 is utilized. The polishing apparatus again includes a support or table 86 upon which are mounted three rotatable holders 87 for receiving the lens blank holding cups 56 and 57. Each holder 87 is mounted on a spindle 88 driven by a belt drive 89 from a motor 90. The spindle is supported by a yoke and spaced bearings similar to the yoke and bearings for spindles 48. The three holders are surrounded by a trough 91 extending lengthwise of the table for receiving the overflow of polishing compound or rouge which is directed into each of the lens blank cups mounted on the polishing apparatus by means of tubing 92 communicating with a header pipe 93. A suitable drain connection including a pipe 94 is connected to one end of the trough and if desired the compound can be recycled by means of a pump, not shown.

Rearwardly of the trough adjacent each of the rotary holders 87 is a platform 95 receiving a bracket 96 which is bifurcated and the arms of which have aligned apertures therein for receiving a pintle 97. This pintle extends at an angle to the horizontal and journals another arm 98 which extends at an angle to the vertical plane passing through the bracket 96 and pintle 97. The upper end of this arm 98 is flanged at 99 and receives an angle member 100 to one leg of which is bolted a post support 101. This post support is provided with an aperture 102 for receiving a post 103 and a transversely extending aperture 104 receiving a set screw 105 for adjustably positioning the post. The lower end of each post is rounded or provided with a ball end 106 for cooperation with a similarly formed socket 107 in the upper end and centrally of each of the polishing members. The arrangement illustrated in FIG. 19 is for polishing the general vision field which was generated in accordance with the relationship shown in FIG. 3. In this connection, the polishing member 108 shown in FIG. 21 is utilized and the radial extent of the blank contacting face 109 is such that with the blank holding cup 56 secured to the rotary holder 87, the polishing member 108 placed upon and in contact with the blanks and the post 103 pushed down so that its ball end 106 bears in the socket 107 to hold the polisher in contact with the blank, rotation of spindle 88 and thus cup holder 87 and cup 55 will result in polishing the general vision field. The polishing member 108 wobbling during the polishing action due to the ball and socket connection and the pivotal mounting of the arm 98 in the bracket 96. The cups 56 and 57 are secured on the holders 87 by means of rubber gaskets similar to the relationship of the cups with the holders.

The polishing surfaces 114 and 115 of polishers 110 and 111 are of different radial extent and angularity as compared with surface 109. This ensures that the polishing action is limited to the particular field being polished. The polishing mechanisms for polishing the other fields of the lens blanks are similar with the exception that the polishing members 110 and 111 per se are different sized and, of course, have different extents of the blank contacting surface and the posts 103 have different size balls on the lower ends thereof to cooperate with the different sized sockets 112 and 113 illustrated in FIGS. 22 and 23 respectively.

It is thus clear that there is provided a polishing assembly including a table, three pivotally mounted post supporting members with the posts adjustably positioned in the members and having balls on the ends thereof to cooperate with sockets in the upper surface of the polishing members. Subjacent each of these post-supporting units are rotary holders for the lens blank holding cups. In the polishing operation, only the holders and cups are driven by the drive imparted to the spindles 98, any rotation of the polishing members 108, 110 and 111 being occasioned by contact of the blanks with the polishing members.

Thus, it is clear that after the first or general vision field is generated, the cup 56 is removed from the grinder shown at the left of FIG. 1 and mounted on the polisher shown at the left of FIG. 17. Of course, during the grinding operation, it will be understood that the tools are diamond grinders and a mixture of oil and water is introduced into the cups 55 and 56 and overflows into the pans P mounted on the discs 52. In this connection, there is shown in FIGS. 1 and 2 a trough T mounted on the supporting surface 2 rearwardly of the pans P and the circulating system for abrasive includes the flexible pipes or tubes S connected to header pipe R. Each tube is valve controlled at H and the header pipe R conveying the oil and water mixture which is supplied by a recirculating system including a suitable pump, not shown. Since the trough T is tilted and a conduit or tube D extends from each pan, the abrasive introduced into the lens blank holding cups 56 and 57 during the grinding, which overflows from the cups, passes from the pans into the trough and is recirculated.

As shown in FIG. 1, the motors 45 controlling the spindles 48 are individually controlled so that the rotary lens blank holding cup holders 55 are rotated only when necessary.

After the first polishing stage has been completed, the cup 56 with the blanks, having the ground and polished general vision fields are immersed in cold water usually at 40° F. or placed in a refrigerator so that the pitch is shrunk in order that the lens blanks can be removed. After the blanks are removed, they are, as previously set forth, mounted in a circular series on the other rotatable blocking fixture 78, shown in FIG. 12 that has the curve of the reading portion or field.

The second grinding stage embodies mounting the cup 57 beneath the spindle having the head 36 thereon which generates the reading field. This field is ground, whereupon the cup 57 with the blanks therein is removed and placed beneath the head 37 of the grinding machine for generating the intermediate vision field. As soon as this last field is ground, the cup 57 is mounted on the middle polishing holder 87 for cooperation with the polishing member 11 shown in FIG. 22 and the reading portion of the lens is polished following which the cup 57 is removed and placed on the polishing holder to receive the polishing member 110 shown in FIG. 23 for polishing the intermediate portions.

The foregoing process and apparatus have been described in such a manner that one is able to follow a single batch of blanks L throughout the various stages of operation. Of course, in assembly line production, each grinding head and each rotary polishing holder will be operating simultaneously in conjunction with a lens blank holding cup. The operators of the various grinding and polishing machines will each be charged with a particular stage or phase of operation of the process. While certain batches of blanks are being ground and polished, other batches will, of course, be in the process of being mounted and dismounted from the cups. This just described procedure obviously is in connection with large scale production.

In FIG. 24, the lens blank as moulded is substantially concave-convex and includes upper and lower arcuate portions $a$ and $b$ upon which are generated the general vision and reading fields respectively. The blank is moulded with an arcuate ridge or shoulder $c$ separating these two portions and the side edges $d$ and $e$ are divergent from the bottom or narrow portion $f$ of the blank to the wider or top portion $g$ thereof of the blank. The opposite upper and lower corners $h$ and $j$ respectively are rounded and the sides of the blank are such that, after the grinding and polishing stages are completed, various outline shaped lenses can be made with a minimum of wastage. In other words, as shown in dotted lines in FIG. 31, a fairly large distorted ovate lens $k$ or other outline such as oval, circular, etc. can be circumscribed within, and made from, the blank. The divergent relationship of the sides relative to the bottom and top are obviously such that lenses of polygonal outline can very readily be made from these blanks with minimum wastage.

In FIGS. 25 to 30, the blank is illustrated in various stages of grinding and polishing. FIG. 25 discloses the grinding of the distance field of the blank or lens and this corresponds to the grinding as depicted in FIG. 6. FIG. 27 shows the grinding of the reading field of the lower portion of the blank or lens and this corresponds to the grinding in FIG. 7 and FIG. 29 shows the grinding of the intermediate substantially triangularly-shaped fields and this corresponds to the grinding shown in FIG. 8.

The polishing steps which are intermediate of the respective three aforesaid grinding steps are performed as hereinbefore described.

The blank or lens as shown in FIG. 24 is the raw moulded blank and it has formed on the concave side thereof an arcuate ridge or shoulder $c$ and this ridge may be as shown in FIG. 32 where the same is inclined downwardly from the front to the reading field, but in moulding, the inclination of the ridge or shoulder may vary and in some instances may be substantially vertical, but arcuately disposed as shown in FIG. 24.

During the first grinding stage or step, the distance field $a'$, as shown in FIG. 25, has been ground and this grinding results in forming the ledge $c'$ and which ledge is shown in FIG. 33 and it is to be noted that the inclination is downwardly toward the outer surface of the lens or blank. In other words, the ridge $c$, as shown in FIG. 32 which is inclined rearwardly, is now inclined downwardly in the opposite direction to that shown in FIG. 32. This inclined ledge is such that in the finished blank and in the finished lenses it can be left by running the finger nail over the end and will result in a slight stoppage or hooking of the finger nail behind the ledge.

The aforesaid ground blank of FIG. 25 and, of course, there would be a plurality of such blanks in the first cup 56, are then as aforesaid removed from that cup and the distance field $a'$ is then polished as shown in FIG. 26. The lenses are then mounted in the cup 57 and the reading field $b'$, FIG. 27, is then ground and in grinding this reading field, the oppositely disposed elongated triangularly-shaped and substantially vertically disposed wings or walls $w$ are formed in the blank. In other words, that portion of the blank having been ground is lowered relative to the distance field portion $a'$ and these wings are clearly shown in FIG. 27. FIG. 28 shows the blank or lens as having its reading field $b'$ polished. In FIG. 29 the intermediate fields $n$ are ground and this grinding results in eliminating the wings or triangular oppositely spaced walls $w$. In this third grinding step, the inclined ledge $c'$ which originally extended from side edge to side edge of the blank is eliminated except as to the opening in the lens, and which opening is defined (by the portion of the lens) by the intermediate transverse portion of the lens directly between and extending into the opposed apices of the intermediate triangular fields $n$. In other words, depending upon the longitudinal length of the intermediate triangular fields $n$ and where the apices of these fields terminate in oppositely aligned spaced relationship, this determines the width of the opening of the lens both in its blank form and in the finished lenses as they are used in spectacles, eye glasses.

In FIG. 30 the intermediate fields $n$ have been polished as hereinbefore described.

It will thus be clear that there has been described a process and apparatus for the production of a plurality of homogeneous, mono-centric, multi-focal lenses in predetermined sequential grinding and polishing stages. In connection with the apparatus, inverted, cup-shaped diamond grinding elements are utilized with beveled blank contacting faces, the extent of which and the diameters of which elements are dependent, of course, upon the size, curvature and disposition of the field being ground. There has been provided a polishing assembly including a plurality of rotary holders for cups supporting the lens blanks mounted subjacent pivotal post supports which receive posts that act as hold-downs for pressing polishing elements against the faces of the lens blanks supported in the cups on the rotary holders.

Briefly, therefore, the process comprises moulding a solid homogeneous blank, the particular blank having straight bottom, curved cup, straight sides diverging outwardly from the bottom to the top and embodying an arcuate shoulder separating the upper arcuate general vision field from a lower arcuate reading field. He first generates by diamond grinding the upper arcuate vision field, the second stage or step comprises polishing this field, he then generates by diamond grinding the lower arcuate reading field, the next step comprises generating again by diamond grinding triangular shaped intermediate fields the apices of which face one another and lie on the juncture between the upper and lower fields. The first grinding stage or step provides an inclined ledge between the upper and lower fields and the third grinding step effaces this ledge except in that area of the blank between the apices of the triangular portions defining the intermediate fields. The grinding stages and the first polishing stage having been completed, he next polishes the lower arcuate or reading field and then polishes the triangular shaped intermediate fields. The blank so produced is now ready for final cutting as to outline and shape.

From the broad aspect, the invention comprehends apparatus for the production of a solid, homogeneous, one-piece, multi-focal, monocentric lens in separating grinding and polishing steps as regards the general vision or distance, the reading and the intermediate fields and in the grinding of the general vision field, the novel ledge for eliminating optical jump with its face directed toward the general vision field is simultaneously formed. Then, too, the peculiar arcs of grinding of the distance and reading fields enables a plurality of the said lenses to be produced simultaneously, as for example, there are six such blanks shown and described herein.

The lens or lenses hereinbefore described are bifocal and monocentric. In manufacturing the lenses there results a perfect distance field and reading and intermediate fields all of which are merged as closely as possible during the grinding and polishing operation. It is understood, of course, that any type of lens can be made from the blank as shown in FIGS. 30 and 31 or rather different sizes and outlines of lenses can be made from these blanks in said figures or drawings. It is to be noted that in making the lenses of the present invention, the distance field is first generated or ground and polished which is just the reverse of the present day methods of making bifocal lenses, and this enables me to produce the very unique lens with the uniquely formed and disposed ledge which is the opening in the lens between the apices of the oppositely disposed and aligned intermediate fields of the lens. In using the finished lens, whatever outline it may be, the eye travels directly from the reading to the distance field or vice versa without any jumping whatsoever, and, indeed, without blurring the reading matter whatever it may be. The effect of using these lenses in eye glasses is that one hardly knows that he is wearing glasses and particularly bifocal lens eye glasses.

The grinding and polishing of the intermediate field $n$ results in merging the said intermediate fields into the respective distance and reading fields of the lens. In the finished lens blank as depicted in FIG. 30 of the drawings, the appearance of the substantially triangularly-shaped intermediate fields $n$ are actually visible, nevertheless, the ground portions of the intermediate fields are so merged into the respective distance and reading fields as to prevent any aberration, and the opening or usable area that is formed by the ledge $c'$ which extends between the apices of the intermediate fields, will not reflect light into the eyes of the user, nor will this usable area in the form of a ledge result in any halo or aberration when the user is utilizing either the distance or the reading field of the lens. Also, when the eyes of the user pass over the ledge $c'$, either from the distance field or vice versa, the so-called jump or cutting of the words or letters in half and blurring of the same is eliminated.

It is understood that the length of the said usable area which is constituted by the ledge $c'$ in the finished lens blank as shown in FIG. 30, can be made of less length by grinding the oppositely disposed intermediate fields further in and, obviously, could be made of greater length by a lesser grinding in these intermediate fields. It has been found that a 23 millimeter opening or usable area of the lens is quite effective but, of course, that usable area as aforesaid can be varied during the grinding of the intermediate fields down to about 15 millimeters. In speaking of the opening, it is understood that this means the slightly inwardly inclined ledge $c'$ that is formed on the finished lens blank such as shown in FIG. 30 and which ledge extends between apices of the opposed intermediate ground and polished fields of the lens and, of course, this ledge is between the distance and reading portions of the lens. The optical or axial center of my lens is at a point directly indicated at $x$ in FIG. 30 which is the midpoint between the opening or ledge of the lens. Thus, the monocentric, one-piece bifocal lens is produced and there results an enlarged reading and distance field, as compared with prior bifocal lenses.

One of the remarkable features of the present lenses is that either when dismounted or mounted in an eye glass frame and placed below a light to make a reflection of the lenses, the aforesaid opening or usable area of the lens, or lenses, even through the ledge, which is a very slight ledge, of course, and almost imperceptible to the eye, does not produce any shadow on a surface. To the contrary, other bifocal lenses under such light define an uninterrupted shadow which results from the line of demarkation between the distance and reading fields or a lens, or lenses. This results in utilizing the present lenses with a feeling of the wearer or user as having no glasses on whatsoever.

What is claimed is:

1. Apparatus for producing a plurality of solid, one-piece, homogeneous, multi-focal, monocentric lens blanks including a plurality of rotatably mounted lens blank supports, means embodied therewith for supporting a plurality of blanks in a circle and in spaced relation to one another in a manner whereby at least a portion of the faces of the blanks so supported will lie in an arcuate plane corresponding to the radius of curvature of a one field of a lens, means for adjustably disposing the support for rotation about an inclined axis passing through the center of said circle, a first grinding head having an annular inclined blank contacting grinding face of one diameter for said one field, means for rotating and vertically feeding said head toward said blank supporting means for grinding engagement with blanks thereon while the latter are rotating, additional rotatable lens blank holding supports each mounted for rotation about inclined axes, and including means for supporting the blanks in a circle and in an arcuate plane corresponding to the radius of curvature of another field to be generated thereon, additional rotatable and vertically movable grinding heads each respectively comprising annular inclined blank contacting faces having diameters for generating the said other and an intermediate field, said heads all being positioned in working relationship with their respective blank supporting means with the grinding faces of the heads encircling said axes of rotation of the blank supporting means while the grinding faces of the heads are in grinding contact with blanks on the supporting means and polishing means including individual rotatable supports for respectively receiving and rotating the blanks about vertical axes, and polishing heads adjustably supported superjacent said supports and each having annular blank contacting faces having diameters correlated with the size and disposition of the individual fields generated on the blanks for polishing the respective fields.

2. Apparatus for simultaneously producing a plurality of solid, one-piece, homogeneous, multi-focal, monocentric lens blanks comprising a plurality of rotatable and vertically movable grinding means and a plurality of rotatable supports mounted on an inclined axis subjacent each of the grinding means, lens blank holding means for supporting a number of lens blanks in a circle with the blanks in spaced relation to one another and with the faces of the blanks having at least portions thereof lying in an arcuate plane corresponding to the radius of curvature of a first field to be generated, additional and similar blank supporting means for supporting the blanks in spaced relation to one another and in a circle of the same diameter as the first mentioned circle and with the faces of the blanks for at least portions thereof lying in a different arcuate plane from the first mentioned plane to correspond to the radius of curvature of a second field to be generated, means for securing the blank supports to the rotatable support for rotation therewith, means for feeding the respective grinding means toward the rotating supports for grinding engagement with blanks thereon o respectively generate the said first and second fields on the blanks, and individual correlated polishing means for polishing each of the generated fields.

3. Apparatus as defined in and by claim 2 in which the grinding means each includes an annular beveled grinding face having a diameter and inclination correlated with the curvature and area of the respective first and second fields, and in which the individual polishing means include annular beveled blank contacting surfaces having diameters and inclinations correlated with the area and curvature of the respective generated distance, reading and intermediate fields.

4. Apparatus for simultaneously producing a plurality of solid, one-piece, homogeneous, multi-focal, monocentric lens blanks wherein each lens has an upper arcuate distance field, a lower arcuate reading field, and oppositely disposed triangular shaped intermediate fields the apices of which intermediate fields face one another and lie substantially intermediate the upper and lower distance and reading fields at opposite edges of the blank, and an arcuate shoulder having its face inclined away from the upper distance field constituting the juncture between the upper and lower portions; said apparatus comprising an annular, beveled blank contacting grinding elements having diameters and bevels correlated with the areas and curvatures of the respective fields to be generated, separate means for rotatably supporting the lens blanks in a circle for rotation about an axis inclined to the vertical with the respective areas to be ground on the blanks facing upwardly, the said separate supporting means having arcuate lens supporting surfaces for maintaining lens blanks on respective curves corresponding to the radius of curvature of the respective distance and reading fields, said last mentioned means being mounted subjacent the grinding elements, means for rotatably and vertically moving the annular grinding elements toward the blank supporting means with the latter in encircling relation with the said axis of rotation whereby to respectively generate in a plurality of blanks simultaneously the said distance, reading and intermediate fields, and means for individually polishing the generated fields.

5. Apparatus as defined in and by claim 4 in which the means for rotatably supporting the blanks including a spindle means for driving the same, a cup carried thereby, means for adjusting the angularity of the spindle, and means for removably securing the last mentioned cup in the first mentioned cup for rotation therewith.

6. Apparatus as defined in and by claim 5 in which the polishing means comprises a frame, individual vertically positioned rotatable cups for removably receiving in driving relationship the said lens blank holding cups, a bracket secured on the frame adjacent each vertically positioned rotatable cup, each bracket having a bifurcated arm, aligned apertures in the arms the axis of which is inclined and extends at a downward angle to the frame, a pintle through said aperture, a second bracket journaled on each said pintle and including an arm extending at an angle to the vertical plane passing through the said bifurcated arm, supporting means carried by each said last mentioned arm, a post vertically adjustably carried by each of said supporting means with their respective axis in alignment with the axis of the respective vertically disposed rotatable supports and each post terminating in a balled end, a plurality of polishing members each having an annular beveled blank contacting face, the diameters and bevels of which annular blank contacting faces are correlated with the area and disposition of the respective generated distance, reading and intermediate fields, each of the polishing members having a socket in the upper end thereof for cooperation of the balled ends with the respective posts, whereby with the polishing members in contact with blanks supported thereneath, the respective members polish the respective fields.

7. Apparatus for producing solid, one-piece, homogeneous, multi-focal, monocentric lens blanks comprising a frame, three vertically movable rotatable annular grinding heads mounted thereon, three angularly adjustable rotatable spindles supported thereon beneath said heads, means for respectively rotating the heads and spindles, lens blank holding cups removably mounted on the spindle for rotation therewith, said cups being formed to receive and support a number of blanks side by side in a circle, an annular grinding element supported by each head over its respective cup and having a beveled blank contacting face of a diameter and bevel angle correlated with respective fields to be generated on the blanks, and each annular grinding element having a working position in relation to its respective cup in which it encircles the axis of rotation of the cup whereby upon rotation of the spindles and thereby the cups, the vertical movement and rotation of the heads and thereby the elements will bring the latter into engagement with blanks in the cups and generate the respective fields individually and simultaneously on a plurality of blanks in the cups.

8. The apparatus as defined in and by claim 7 including means for varying the inclination of the axis of the spindle.

9. The apparatus as defined in and by claim 8 wherein the last mentioned means comprises an apertured disc bearing at least portions thereof on said frame, a sleeve bearing in said disc for receiving said spindle, and axially movable means extending between said disc and a portion of said frame for elevating a portion of the disc relative to the frame to thereby vary the inclination of the spindle.

10. Apparatus for producing optical lenses comprising a supporting structure, a rotatable vertically movable annular grinding means carried by said structure, a horizontal table below the grinding means, a grinding lubricant receiving pan resting for rocking movement on said table below said means, a supporting means for said pan, a lens blank supporting shaft, means connecting said shaft to said rockable pan supporting means whereby the shaft and pan supporting means are rockable as a unit, the shaft having an upper end lying in the pan below and directed toward the middle portion of said annular grinding means, means whereby the pan supporting means may be rocked about an axis perpendicular to said shaft to dispose the shaft for rotation about an axis inclined to the rotary axis of the grinding means while maintaining said upper end of the shaft directed toward said middle portion of the grinding means, the upper end of the shaft being formed to support of a lens blank carrier, and means for transmitting rotation to said shaft.

11. Apparatus for producing optical lenses, comprising a supporting structure, a rotatable vertically reciprocable spindle supported by said structure, means for reciprocating the spindle, means for rotating the spindle, a table disposed below the spindle in a horizontal plane perpendicular to the spindle, a plate disposed above the table and having an edge portion resting thereon for rocking movement on said edge portion, means carried by the plate at the side thereof opposite from the edge portion and engaging the table for rocking the plate to an inclined position with respect to the table, a grinding lubricant receiving pan supported on the plate below the spindle, a lens blank supporting shaft rotatably supported by the plate and extending upwardly therethrough into the pan with its upper end directed toward the lower end of the overlying spindle, the said means for rocking the plate facilitating the disposition of the shaft at an inclination from the vertical, means for imparting rotary motion to the shaft, means for supporting a lens blank carrier upon the upper end of the shaft and within the pan, and a vibration absorbing coupling between the plate and the table.

12. Apparatus of the character stated in claim 11, wherein the said means for rotatably supporting the shaft from the plate comprises a yoke secured to the underside of and depending from the plate, a bearing extending from the yoke through the plate and into the pan and through which the upper end of the shaft extends, and a second bearing carried by the yoke in spaced aligned relation with the first bearing and having the lower end of the shaft stepped therein.

13. The invention according to claim 11, wherein the said vibration absorbing means comprises a pair of pin members disposed on opposite sides of the plate with the said means for facilitating the rocking of the plate being located in a plane passing midway between the pins, said pins each having an upper end swively connected with the plate and extending downwardly therefrom and an expansion spring encircling each pin and operatively coupled at its lower end with the pin and having its upper end bearing against an overlying portion of the table, the expansion springs being maintained under tension and normally exerting a downward pull upon the plate.

14. The invention according to claim 13, wherein the said means for rocking the plate to an inclined position comprises a screw threaded through the plate and bearing at its lower end upon the underlying table.

References Cited in the file of this patent

UNITED STATES PATENTS

| | | |
|---|---|---|
| 2,286,361 | Goddu | June 16, 1942 |
| 2,600,815 | Turner | June 17, 1952 |
| 2,616,226 | D'Avaucourt | Nov. 4, 1952 |
| 2,643,491 | Burroughs | June 30, 1953 |
| 2,649,667 | Cooke | Aug. 30, 1953 |